US012793873B2

(12) United States Patent
Mizuno et al.

(10) Patent No.: US 12,793,873 B2
(45) Date of Patent: Nov. 10, 2026

(54) SUPERCONDUCTING COIL DEVICE

(71) Applicant: Canon Kabushiki Kaisha, Tokyo (JP)

(72) Inventors: Katsutoshi Mizuno, Nasushiobara (JP); Takehiro Shibuya, Nasushiobara (JP)

(73) Assignee: Canon Kabushiki Kaisha, Tokyo (JP)

( * ) Notice: Subject to any disclaimer, the term of this patent is extended or adjusted under 35 U.S.C. 154(b) by 372 days.

(21) Appl. No.: 18/484,591

(22) Filed: Oct. 11, 2023

(65) Prior Publication Data

US 2024/0161953 A1 May 16, 2024

(30) Foreign Application Priority Data

Oct. 17, 2022 (JP) ................................ 2022-166364

(51) Int. Cl.
*H01F 6/06* (2006.01)

(52) U.S. Cl.
CPC ..................................... *H01F 6/06* (2013.01)

(58) Field of Classification Search
CPC ......................................................... H01F 6/06
See application file for complete search history.

(56) References Cited

U.S. PATENT DOCUMENTS

2018/0350494 A1* 12/2018 Iwai ....................... H01B 12/02

FOREIGN PATENT DOCUMENTS

| | | | | |
|---|---|---|---|---|
| JP | S639903 A | * | 1/1988 | .............. H01F 6/06 |
| JP | 2012227178 A | * | 11/2012 | |
| JP | 2013-225399 A | | 10/2013 | |
| JP | 2014-217564 A | | 11/2014 | |
| JP | 2015-12199 A | | 1/2015 | |
| JP | 2015-073069 A | | 4/2015 | |
| JP | 2015-162495 A | | 9/2015 | |
| JP | 2017-112254 A | | 6/2017 | |
| JP | 2020-013960 A | | 1/2020 | |
| JP | 2021093421 A | * | 6/2021 | |
| WO | WO 2012/086644 A1 | | 6/2012 | |

OTHER PUBLICATIONS

Japanese Office Action issued on Jun. 9, 2026 in Japanese Patent Application No. 2022-166364, 6 pages.

* cited by examiner

*Primary Examiner* — Mohamad A Musleh
(74) *Attorney, Agent, or Firm* — Oblon, McClelland, Maier & Neustadt, L.L.P.

(57) ABSTRACT

A superconducting coil device of an embodiment includes stacked pancake coils. Each of the stacked pancake coils includes an inner frame, a separator disposed outside the inner frame, and a superconducting wire wound part formed on the separator. The superconducting coil device further includes a position adjustment part configured to adjust relative positions of the stacked pancake coils.

14 Claims, 13 Drawing Sheets

SUPERCONDUCTING COIL DEVICE

CROSS-REFERENCE TO RELATED APPLICATION

The present application claims priority based on Japanese Patent Application No. 2022-166364 filed Oct. 17, 2022, the content of which is incorporated herein by reference.

FIELD

Embodiments disclosed in the specification and drawings relate to a superconducting coil device.

BACKGROUND

For example, a magnetic resonance imaging (MM) device uses a superconducting coil device including a high-temperature superconducting magnet. A superconducting magnet has a structure in which a plurality of flat coils called pancake coils are stacked and connected, for example. In a case in which a superconducting magnet is used in an MRI device, high magnetic field uniformity is required, and thus high precision is also required for assembling a plurality of pancake coils. For this reason, a technique for improving assembly accuracy by providing a spigot joint in a winding frame has been disclosed, for example.

However, even if a spigot joint is provided, if the roundness of a winding part is low, the mechanical center and the magnetic field center do not match and thus there is a case in which a uniform magnetic field cannot be obtained.

DETAILED DESCRIPTION

A superconducting coil device of an embodiment will be described below with reference to the drawings. The superconducting coil device of the embodiment is used, for example, in an MRI device. The superconducting coil device is formed by stacking a plurality of pancake coils. In the following description, the direction in which the plurality of pancake coils 1 are stacked is referred to as a stacking direction.

The superconducting coil device of an embodiment includes stacked pancake coils. Each of the stacked pancake coils includes an inner frame, a separator disposed outside the inner frame, and a superconducting wire wound part formed on the separator. The superconducting coil device further includes a position adjustment part configured to adjust relative positions of the stacked pancake coils.

Figure 1:
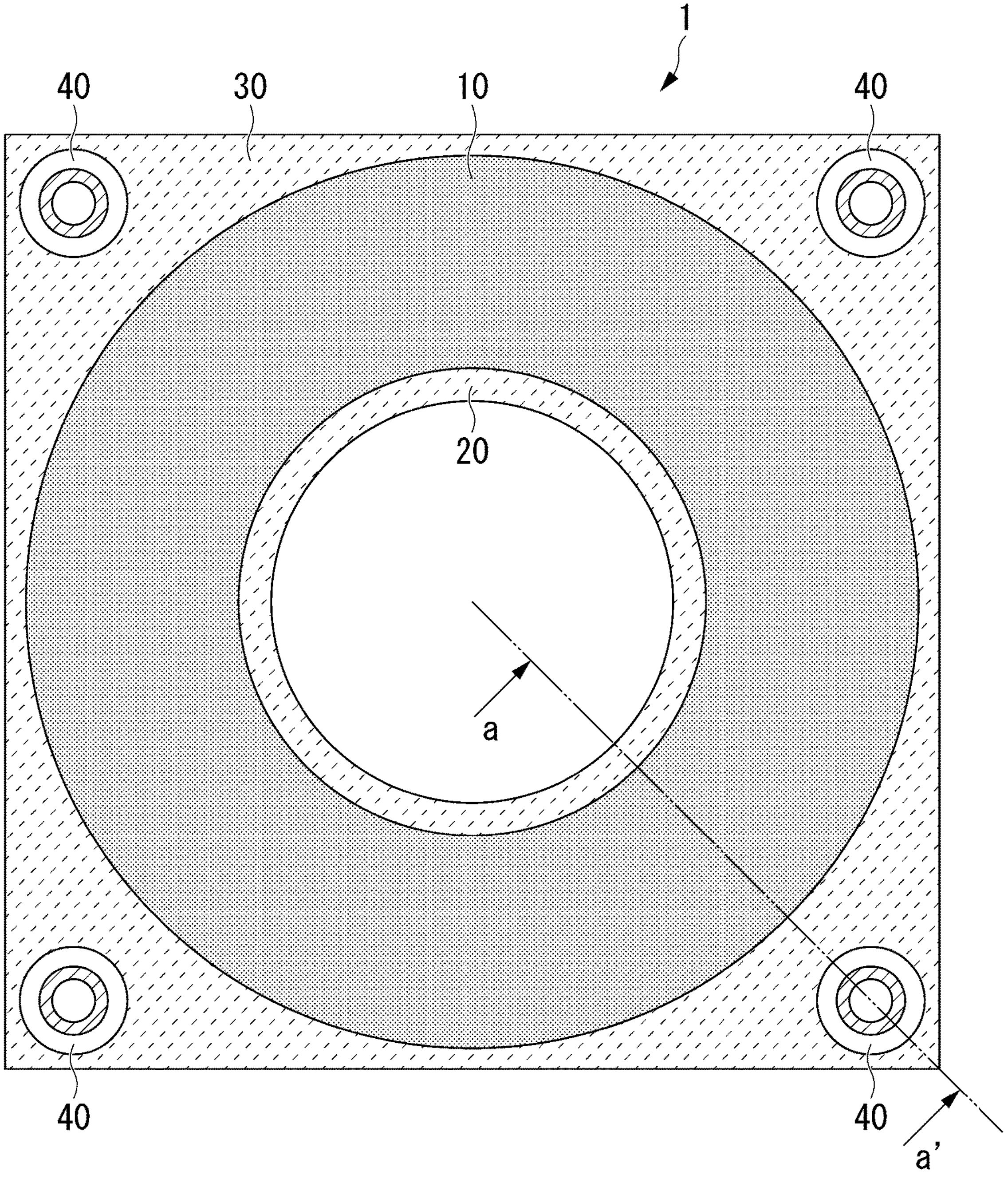
FIG. 1 is a diagram of a pancake coil of an embodiment viewed in a stacking direction.
Figure 2:
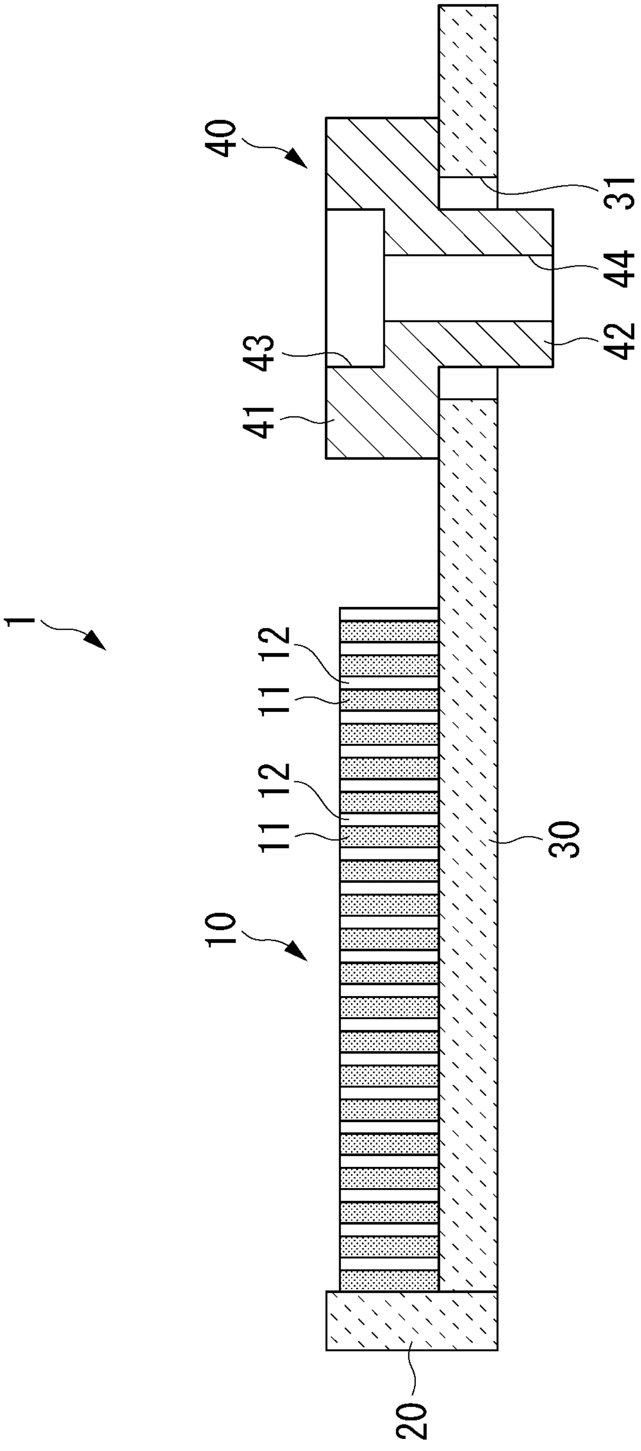
FIG. 2 is a cross-sectional view taken along line a-a' in FIG. 1.

FIG. 1 is a diagram of a pancake coil of an embodiment viewed in the stacking direction. FIG. 2 is a cross-sectional view taken along line a-a' in FIG. 1. The pancake coil 1 includes, for example, a superconducting wire wound part 10, an inner frame 20, a separator 30, and a spigot joint part 40. The pancake coil 1 is a so-called single pancake coil in which the superconducting wire wound part 10 is formed on one side (upper surface) of the separator 30.

The superconducting wire wound part 10 includes, for example, high-temperature superconducting wires 11 and polyimide tapes 12. Each high-temperature superconducting wire 11 has, for example, a tape shape. The superconducting wire wound part 10 is formed by concentrically winding the high-temperature superconducting wires 11 and the polyimide tapes 12 superimposed on each other around the inner frame 20. The superconducting wire wound part 10 is wound in order from the inside. In a cross section of the superconducting wire wound part 10 taken along the concentric axis, the high-temperature superconducting wires 11 and the polyimide tapes 12 are alternately disposed.

The inner frame 20 is disposed at the center of the pancake coil 1. The inner frame 20 has a tubular shape with both end faces open. The inner frame 20 is made of, for example, glass-fiber-reinforced plastics (GFRP), oxygen-free copper, stainless steel, or an aluminum alloy.

The superconducting wire wound part 10 is disposed around the inner frame 20. The concentric axis of the superconducting wire wound part 10 is disposed along the axial direction of the inner frame 20. The height of the inner frame 20 in the axial direction is slightly greater than the height of the superconducting wire wound part 10 in the concentric axial direction. The height of the inner frame 20 in the axial direction may be substantially the same as the height of the superconducting wire wound part 10 in the concentric axial direction.

The separator 30 is a plate member that radially extends in a direction perpendicular to the axial direction of the inner frame 20 with the inner frame 20 at the center. The separator 30 is made of at least one conductive material selected from stainless steel, oxygen-free copper, and an aluminum alloy. The separator 30 may contain an insulating material. The separator 30 has a rectangular shape when viewed in the stacking direction. The shape of the separator 30 when viewed in the stacking direction may be a shape other than a rectangular shape, for example, a polygonal shape, a circular shape, an elliptical shape, an oval shape, or the like.

A fastening hole 31 is formed at the end of the separator 30 opposite to the side on which the inner frame 20 is provided. The fastening hole 31 is formed, for example, at each of the four corners of the separator 30 when viewed in the stacking direction. The fastening hole 31 is formed through the separator 30 along the axial direction of the inner frame 20.

The spigot joint part 40 is made of stainless steel, an aluminum alloy, or GFRP. The spigot joint part 40 includes, for example, a head portion 41 and an insertion portion 42. A large-diameter hole 43 is formed in the head portion 41, and a small-diameter hole 44 is formed in the insertion portion 42. A length by which the head portion 41 protrudes above the separator 30 is greater than the height of the superconducting wire wound part 10 disposed on the upper surface side of the separator 30.

The insertion portion 42 is integrated with the head portion 41. The insertion portion 42 protrudes downward from the lower surface of the separator 30. The head portion 41 and the insertion portion 42 of the spigot joint part 40 are both cylindrical members, for example. The head portion 41 and the insertion portion 42 are coaxially disposed side by side along the axial direction of the inner frame 20 and are integrally formed.

The outer diameter of the insertion portion 42 viewed in the stacking direction is shorter than the inner diameter of the fastening hole 31 in the separator 30. In other words, the inner diameter of the fastening hole 31 in the separator 30 is greater than the outer diameter of the insertion portion 42. The fastening hole 31 of the separator 30 and the insertion portion 42 of the spigot joint part 40 serve as a position adjustment part that adjusts relative positions of the stacked plurality of pancake coils 1. The position adjustment part may be configured by other than the fastening hole 31 of the separator 30 and the insertion portion 42 of the spigot joint part 40.

The length difference between the inner diameter of the fastening hole 31 and the outer diameter of the insertion portion 42 should be such that it can be recognized when the pancake coils 1 stacked in upper and lower tiers are shifted. The length difference between the inner diameter of the fastening hole 31 and the outer diameter of the insertion portion 42 may be greater than the difference between the center of a magnetic field corresponding to the shape of the superconducting wire wound part 10 and the center of the inner frame 20, for example.

The large-diameter hole 43 and the small-diameter hole 44 are both cylindrical, for example. The diameter of the large-diameter hole 43 viewed in the stacking direction is less than the diameter of the head portion 41 and substantially the same as the diameter of the insertion portion 42. The diameter of the small-diameter hole 44 viewed in the stacking direction is less than the diameter of the insertion portion 42. The large-diameter hole 43 and the small-diameter hole 44 are coaxially disposed side by side along the axial direction of the inner frame 20 and integrally formed.

Figure 3:
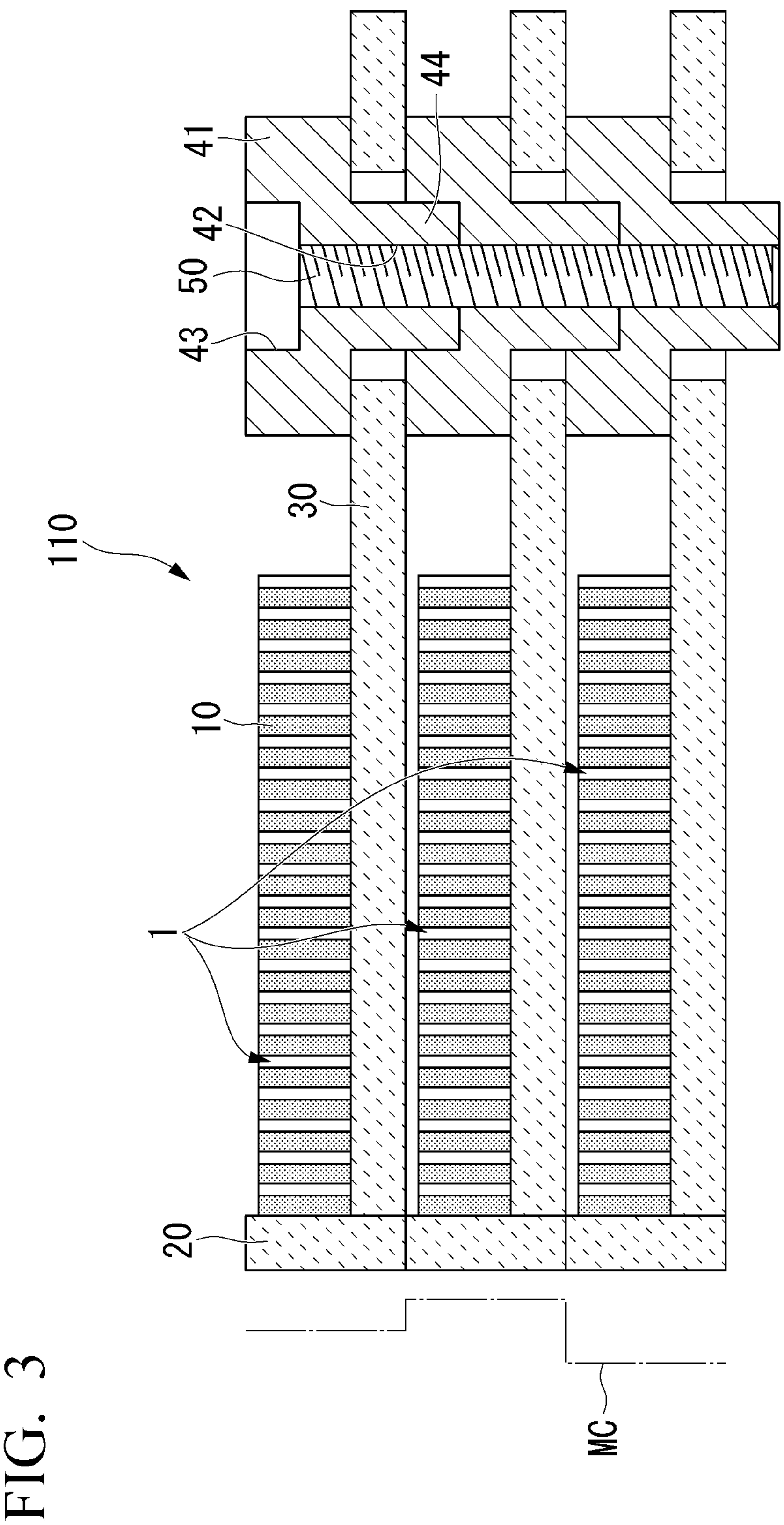
FIG. 3 is a partial cross-sectional view of a superconducting coil device 110 of a comparative example.
Figure 4:
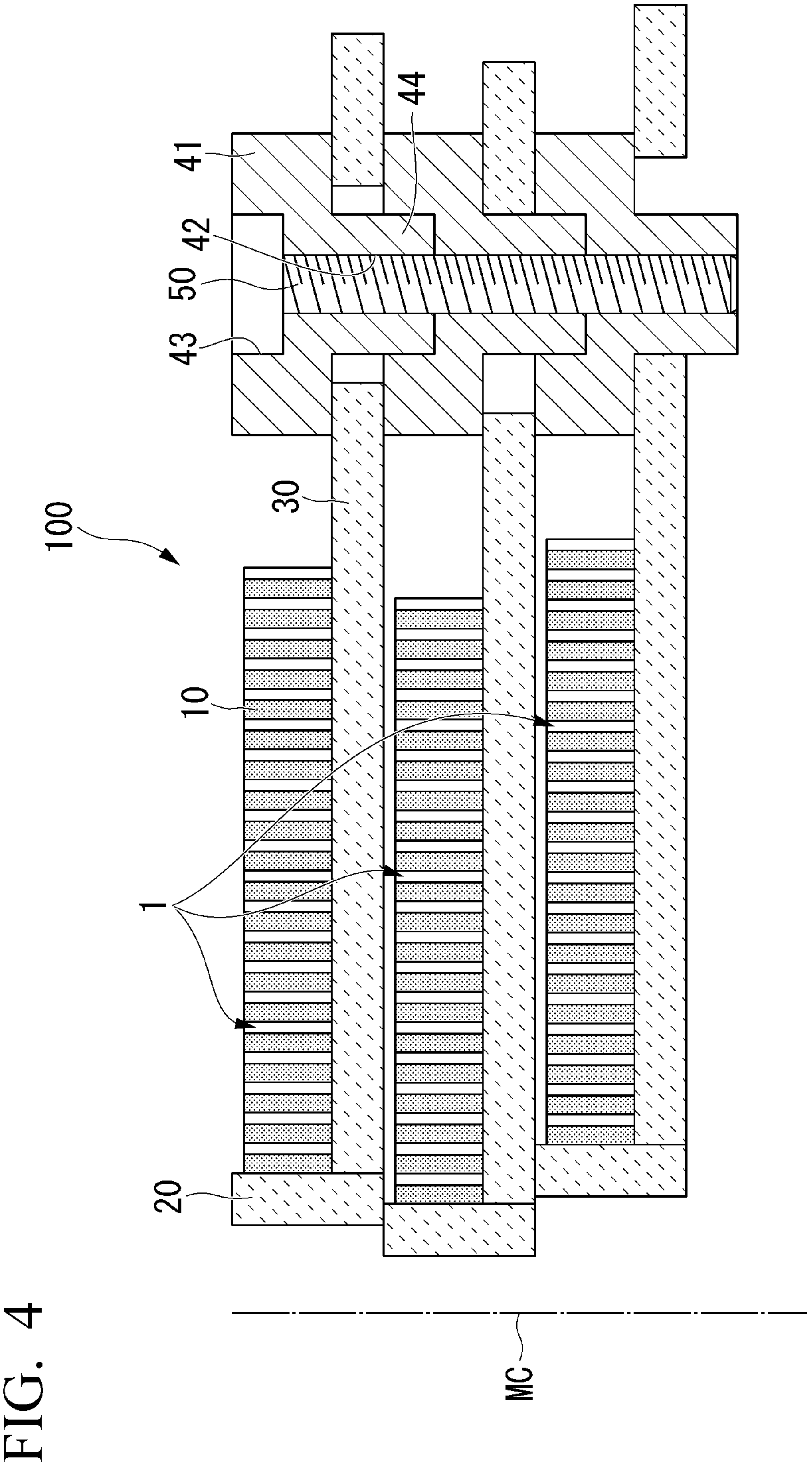
FIG. 4 is a partial cross-sectional view of a superconducting coil device 100 of an embodiment.

Superconducting coil devices will be described below by citing comparative examples in addition to the embodiments. FIG. 3 is a partial cross-sectional view of a superconducting coil device 110 of a comparative example. FIG. 4 is a partial cross-sectional view of a superconducting coil device 100 of the embodiment. The partial cross sections in FIG. 3 and FIG. 4 are cross sections corresponding to line a-a' in FIG. 1.

In the superconducting coil device 110 of the comparative example, inner frames 20 in a plurality of pancake coils 1 are coaxially disposed and stacked. In the stacked plurality of pancake coils 1, the insertion portion 42 of the spigot joint part 40 in the pancake coil 1 stacked in the upper tier is inserted into the large-diameter hole 43 formed in the head portion 41 of the spigot joint part 40, and thus the pancake coils 1 disposed in upper and lower tiers are positioned.

A fastening bolt 50 penetrates the large-diameter hole 43 and the small-diameter hole 44 formed in the spigot joint part 40 in the stacked plurality of pancake coils 1. A nut which is not shown is screwed into the fastening bolt 50 penetrating the plurality of spigot joint parts, and thus the spigot joint parts 40 are fastened to the fastening hole 31 in the plurality of pancake coils 1 and the plurality of pancake coils 1 are fastened by the fastening bolt 50 and the nut. The spigot joint part 40 also serves as a through-hole for the fastening bolt 50 after the pancake coils 1 are stacked. The large-diameter hole 43 and the small-diameter hole 44 are examples of through-holes.

A procedure for assembling the plurality of pancake coils 1 in the superconducting coil device 100 will be described. At the time of assembling the plurality of pancake coils 1, first, the shape of the plurality of pancake coils 1 to be stacked (the shape of the superconducting wire wound part 10) is measured, for example. Subsequently, the central axis of a magnetic field in each of the plurality of pancake coils 1 is identified according to magnetic field analysis. Subsequently, the positions of the plurality of pancake coils 1 are finely adjusted along a plane orthogonal to the central axis such that the central axis of the magnetic field in each of the plurality of pancake coils 1 is disposed in a straight line to determine the positions of the pancake coils 1. The center of the magnetic field can be obtained, for example, by software analysis. The center of the magnetic field may be determined by other means.

Subsequently, the positions of the spigot joint parts 40 with respect to the inner frame 20 (separator 30) in each of the plurality of pancake coils 1 whose positions have been determined are determined. Subsequently, the positions of the spigot joint parts 40 are adjusted to the determined positions using a jig or the like. Subsequently, among the pancake coils 1 adjacent to each other in upper and lower tiers, the insertion portion 42 of the spigot joint part 40 in the upper pancake coil 1 is inserted into the large-diameter hole 43 of the spigot joint part 40 in the lower pancake coil 1. Thereafter, the plurality of pancake coils 1 are assembled by passing the fastening bolt 50 through the small-diameter holes 44 of the plurality of pancake coils 1 and fastening the nut. The point of assembling the plurality of pancake coils 1 by passing the fastening bolt 50 through the small-diameter holes 44 in the plurality of pancake coils 1 and fastening nuts is equally applied to the superconducting coil device 100 of the embodiment.

Since the superconducting wire wound parts 10 in the plurality of pancake coils 1 are eccentric, the centers MC of magnetic fields differs in the plurality of pancake coils 1. Therefore, even if the inner frames 20 are coaxially disposed as in the superconducting coil device 110 of the comparative example, for example, the center MC of a magnetic field is shifted between the stacked pancake coils 1. As a result, when the superconducting coil device 110 is viewed as a whole, the uniformity of magnetic fields decreases.

On the other hand, in the superconducting coil device 100 of the embodiment, the position adjusting part including the fastening hole 31 in the separator 30 and the insertion portion 42 in the spigot joint part 40 is provided, and the inner diameter of the fastening hole 31 is greater than the outer diameter of the insertion portion 42. Therefore, in the superconducting coil device 100 of the embodiment, the spigot joint part 40 is adjustable in distance from the inner frame 20, and the stacked pancake coils 1 are disposed such that the centers MC of magnetic fields match although the inner frame 20 is shifted. Therefore, the superconducting coil device 100 of the embodiment can obtain uniform magnetic fields.

Further, the separator 30 is formed including a conductive material. Accordingly, the separator 30 serves as a bypass path that bypasses a current path of the superconducting wire wound part 10. Therefore, it is possible to curb the current flowing through the superconducting wire wound part 10 from excessively increasing, thereby curbing generation of heat.

Subsequently, modified examples of the superconducting coil device of the embodiment will be described. All of the modified examples which will be described below are different in the aspect of the pancake coil 1. Hereinafter, pancake coils in superconducting coil devices of the modified examples will be described, focusing on differences from the pancake coil 1 in the superconducting coil device 100 of the embodiment.

First Modified Example

Figure 5:
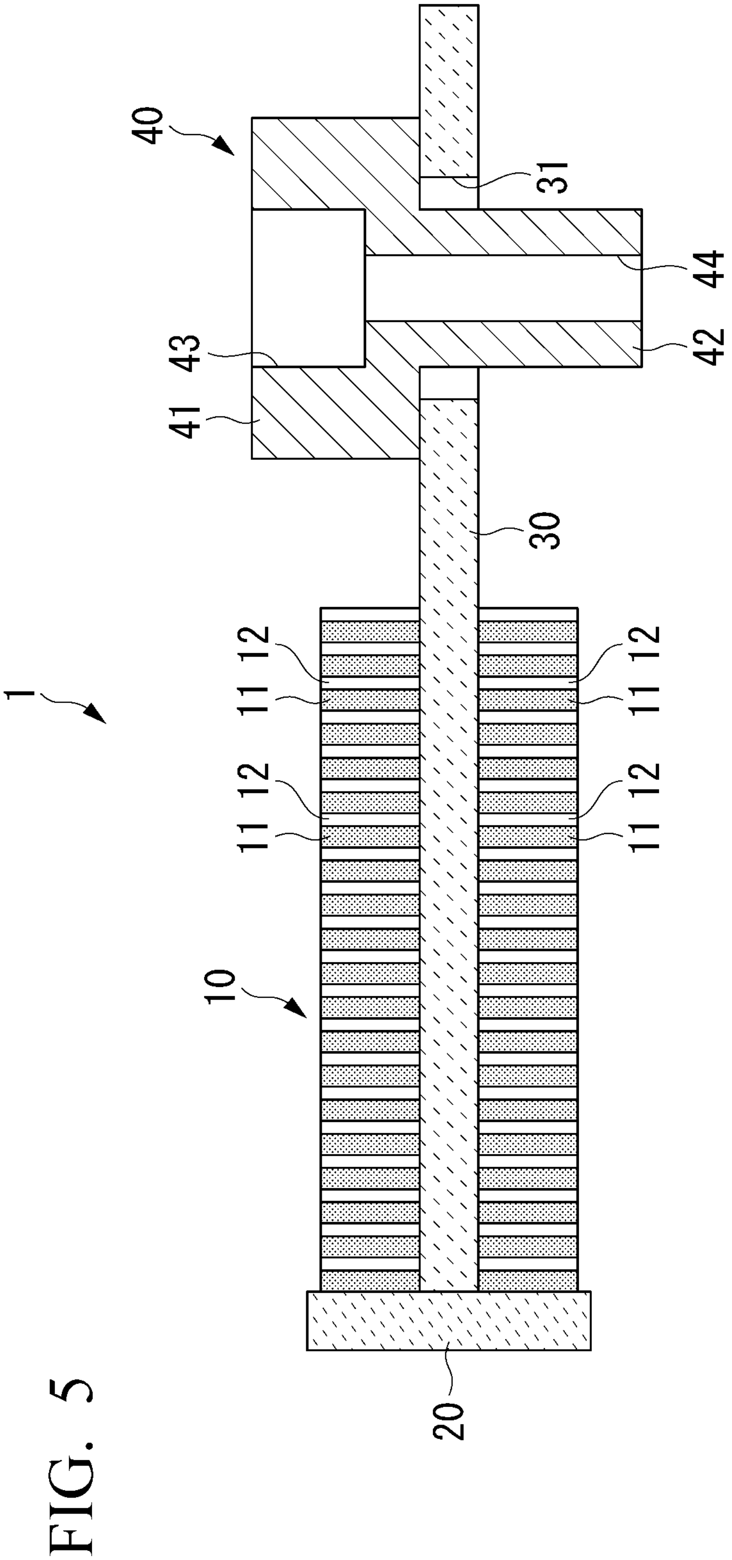
FIG. 5 is a partial cross-sectional view of a pancake coil 1 of a first modified example.

Next, a first modified example will be described. FIG. 5 is a partial cross-sectional view of a pancake coil 1 of the first modified example. The partial cross section in FIG. 5 is a cross section corresponding to line a-a' in FIG. 1. The pancake coil 1 of the first modified example is a so-called double pancake coil in which the superconducting wire wound part 10 is formed on both surfaces (upper surface and lower surface) of the separator 30.

The superconducting wire wound parts 10 provided on the upper surface side and the lower surface side of the separator 30 are both wound in order from the inside. The inner portions of the superconducting wire wound parts 10 provided on the upper surface side and the lower surface side are electrically connected by, for example, soldering or the like. Moreover, although the inner frame 20 extends upward from the separator 30 in the embodiment, the inner frame 20 extends upward and downward from the separator 30 in the first modified example.

The superconducting wire wound parts 10 disposed on the upper surface side and the lower surface side of the separator 30 are formed by concentrically winding the high-temperature superconducting wires 11 and the polyimide tapes 12 superimposed on each other around the inner frame 20 as in the pancake coil 1 of the embodiment. The superconducting wire wound parts 10 disposed on the upper surface side and the lower surface side may have the same shape or may have different shapes due to different heights, different numbers of turns, and the like.

In the spigot joint part 40 fastened to the fastening holes 31 provided at the four corners of the separator 30, the length by which the head portion 41 protrudes above the separator 30 is greater than the height of the superconducting wire wound part 10 disposed above the separator 30. In addition, the length by which the insertion portion 42 of the spigot joint part 40 protrudes below the separator 30 is greater than the height of the superconducting wire wound part 10 disposed below the separator 30.

In the superconducting coil device of the first modified example, similarly to the superconducting coil device 100 of the embodiment, the inner diameter of the fastening hole 31 in the separator 30 viewed in the stacking direction is greater than the outer diameter of the insertion portion 42 in the stacked plurality of pancake coils 1. Therefore, upper and lower pancake coils 1 can be disposed such that the centers MC of magnetic fields match, and thus the superconducting coil device 100 can obtain uniform magnetic fields.

Further, since the superconducting coil device of the first modified example is a double pancake having two superconducting wire wound parts 10, it is possible to generate a large magnetic field in a narrow installation range. Moreover, the length by which the insertion portion 42 protrudes below the separator 30 is greater than the height of the superconducting wire wound part 10 disposed below the separator 30. Therefore, it is possible to easily stack a plurality of double pancake coils.

The superconducting coil device 100 in the above-described embodiment is formed by stacking single pancake coils, and in the first modified example, formed by stacking a plurality of double pancake coils. On the other hand, the pancake coils stacked in the superconducting coil device may be a mixture of single pancake coils and double pancake coils.

Second Modified Example

Figure 6:
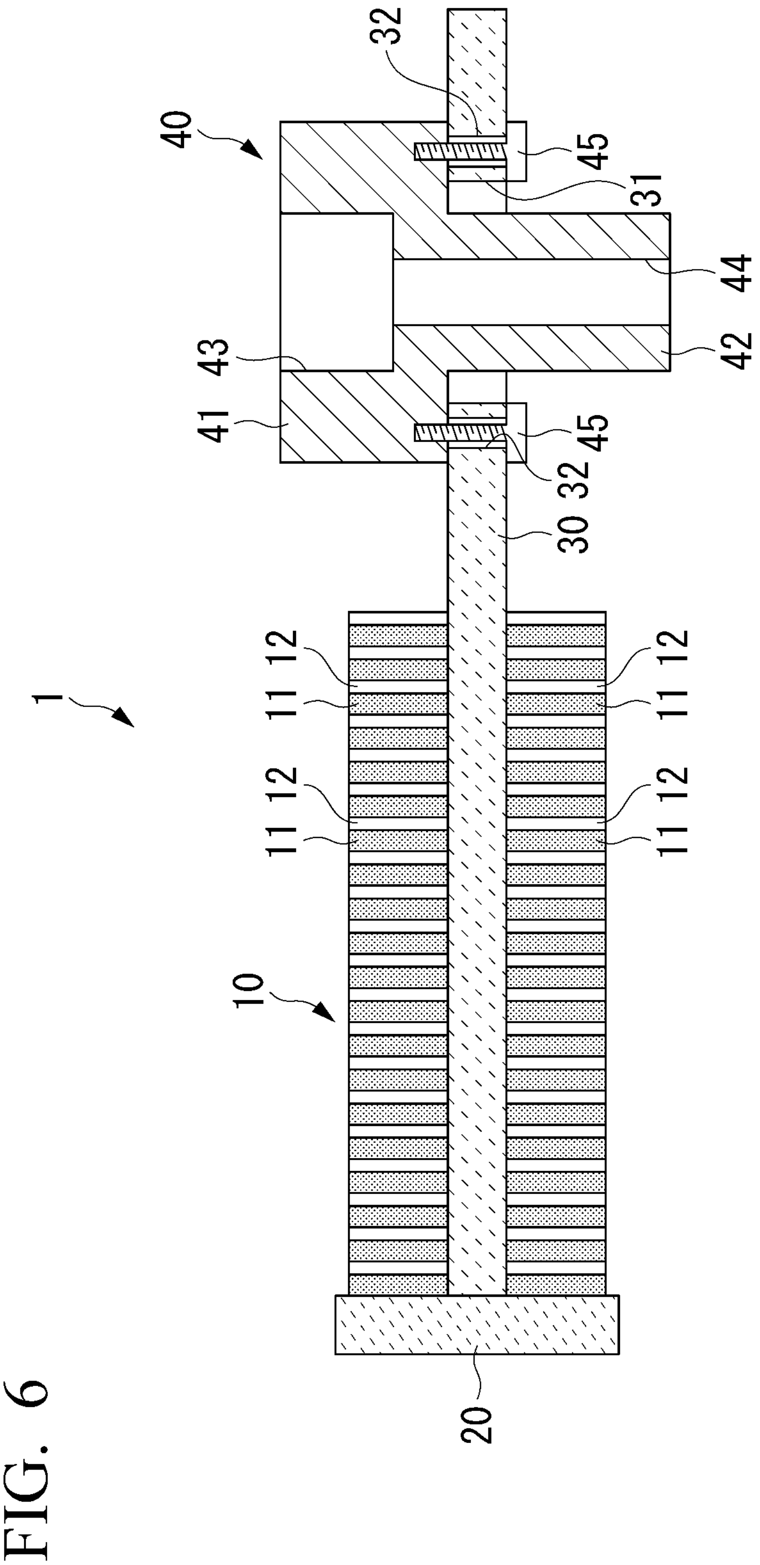
FIG. 6 is a partial cross-sectional view of a pancake coil 1 of a second modified example.

Next, a second modified example will be described. FIG. 6 is a partial cross-sectional view of a pancake coil 1 of the second modified example. The partial cross section in FIG. 6 is cross section corresponding to line a-a' in FIG. 1. In the pancake coil 1 of the second modified example, the spigot joint part 40 is fixed to the separator 30 by screwing the head portion 41 to the separator 30 with a bolt 45. A female threaded portion into which the threaded portion of the bolt 45 is screwed is formed in the head portion 41 of the spigot joint part 40.

A bolt through-hole 32 is formed in the separator 30 at positions outside and inside the fastening hole 31 viewed from the inner frame 20. The threaded portion of the bolt 45 that penetrates the bolt through-hole 32 from below is screwed into the female threaded portion of the spigot joint part 40 and the separator 30 is sandwiched between the bolt 45, the head portion, and the head portion 41 of the spigot joint part 40, and thus the spigot joint part 40 is fixed to the separator 30. Other points in the pancake coil 1 of the second modified example are similar to those of the pancake coil 1 of the first modified example.

The superconducting coil device of the second modified example has the same effects as the superconducting coil device 100 of the first modified example. Furthermore, in the superconducting coil device of the second modified example, the spigot joint part 40 is fixed to the separator 30 using the bolt 45. Therefore, the spigot joint part 40 can be attached to the separator 30 in a stable state.

Although the spigot joint part 40 is fixed to the separator 30 using the bolt 45, the spigot joint part 40 may be fixed to the separator 30 in another manner. For example, the spigot joint part 40 may be fixed to the separator 30 with an adhesive or other fastening members, or may be fixed to the separator 30 using both a bolt and an adhesive.

Third Modified Example

Figure 7:
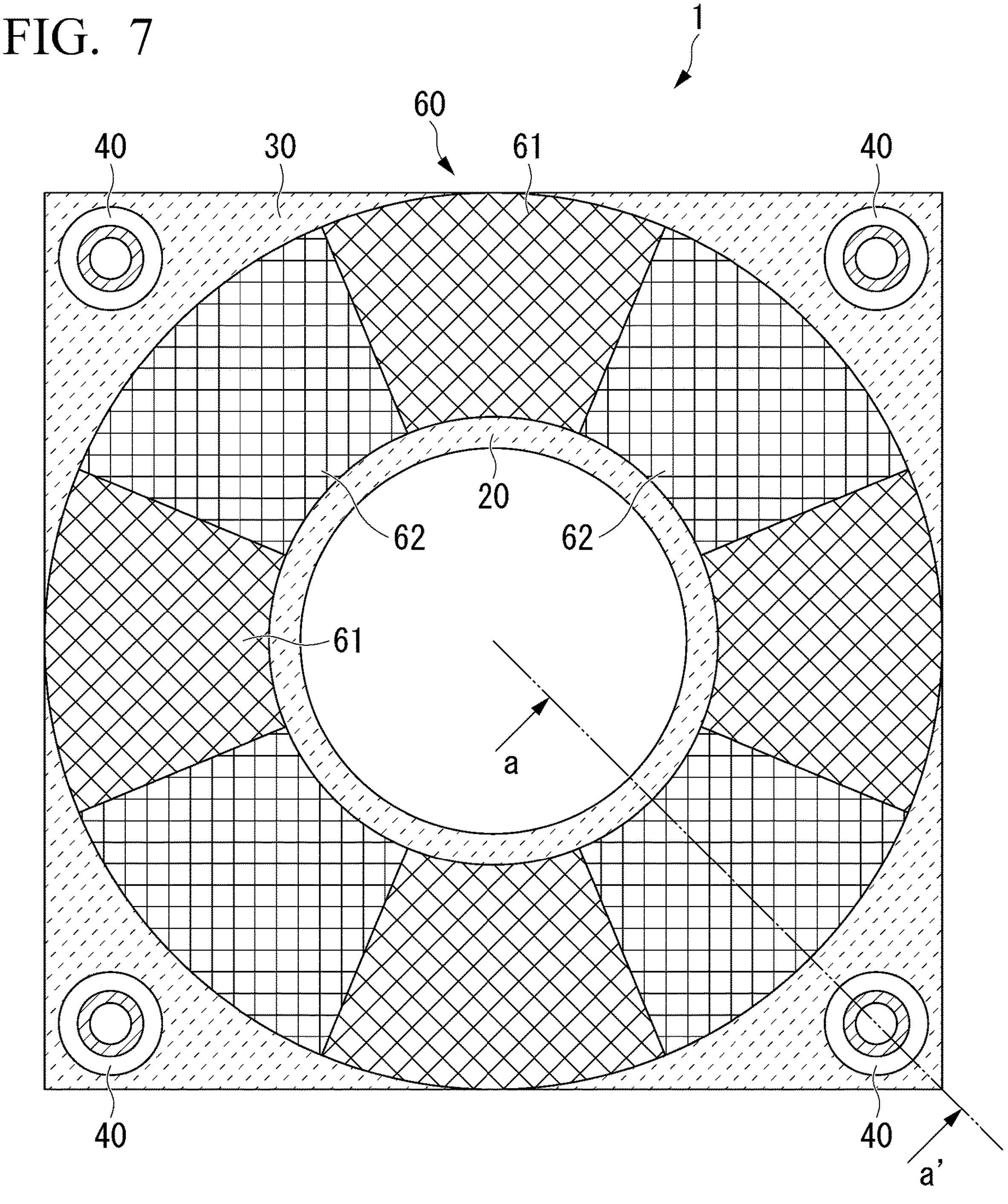
FIG. 7 is a diagram of a pancake coil of a third modified example viewed in a stacking direction.
Figure 8:
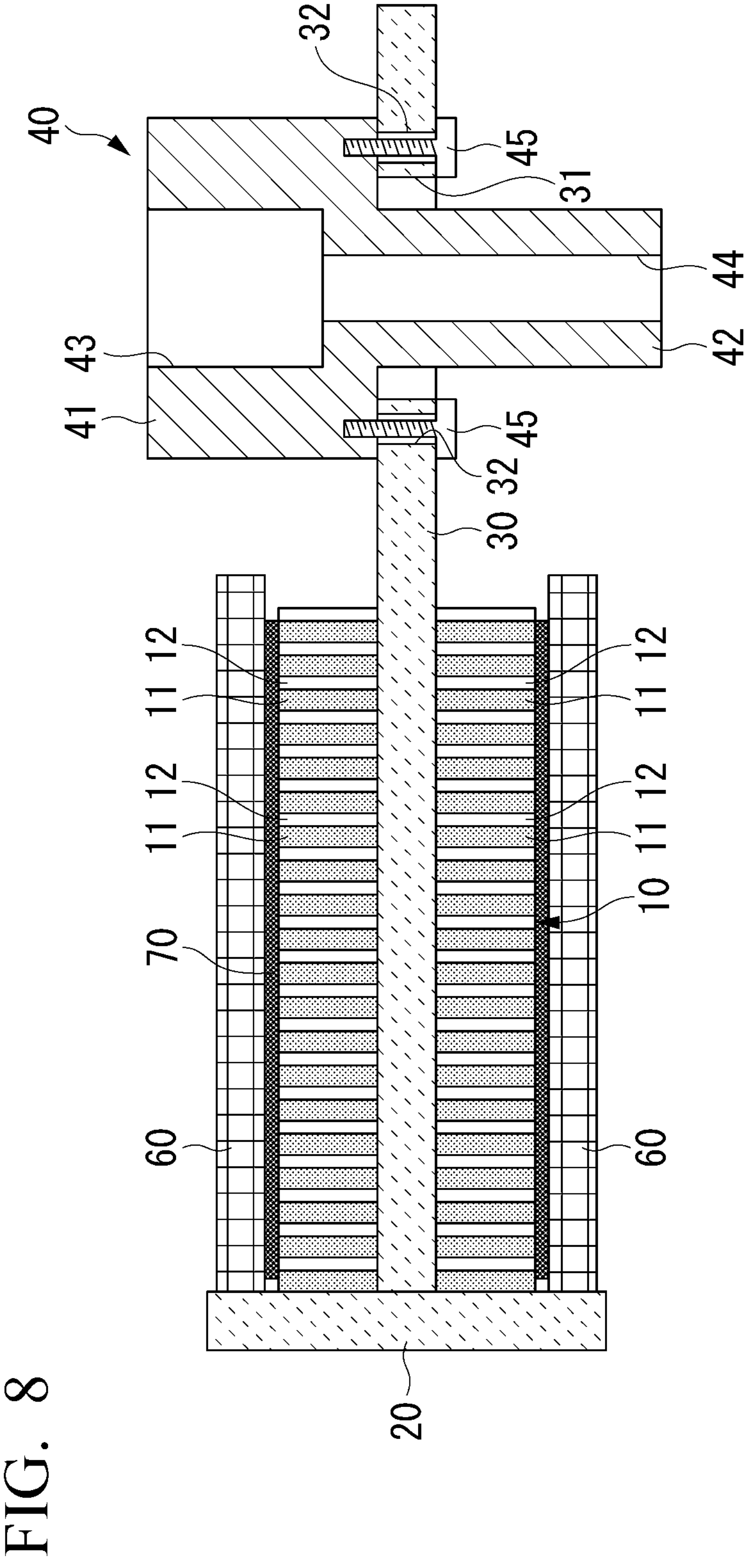
FIG. 8 is a cross-sectional view taken along line a-a' in FIG. 7.

Next, a third modified example will be described. FIG. 7 is a diagram of a pancake coil of the third modified example viewed in the stacking direction. FIG. 8 is a cross-sectional view taken along line a-a' in FIG. 7. The pancake coil 1 of the third modified example is mainly different from the pancake coil 1 of the second modified example in that a top plate 60 is provided.

In the pancake coil 1 of the third modified example, the top plate 60 is adhered to the surface of the superconducting wire wound part 10 opposite to the side on which the separator 30 is disposed. Specifically, the top plate 60 is provided further above the superconducting wire wound part 10 provided on the upper surface side of the separator 30 and further below the superconducting wire wound part 10 provided on the lower surface side of the separator 30. An adhesive layer 70 is formed between the superconducting wire wound part 10 and the top plate 60. The top plate 60 is adhered to the superconducting wire wound part 10 by the adhesive layer 70. The adhesive layer 70 is made of, for example, epoxy resin, thermoplastic resin, or the like.

The top plate 60 has a hollow circular, so-called donut shape when viewed in the stacking direction. The top plate 60 is divided into a plurality of pieces when viewed in the stacking direction. The top plate 60 is divided into 8 equal parts at equal intervals of 45°, for example. The top plate 60 is configured by alternately disposing a first top plate member 61 and a second top plate member 62.

The top plate 60 may be divided at non-equidistant intervals or may not be divided. The top plate 60 may be provided either further above the superconducting wire wound part 10 provided on the upper surface side of the separator 30 or further below the superconducting wire wound part 10 provided on the lower surface side of the separator 30. High-purity aluminum or the like may be used for the top plate 60.

The first top plate member 61 is, for example, a top plate made of conductive oxygen-free copper. The second top plate member 62 is, for example, a top plate made of non-conductive GFRP. The first top plate member 61 and the second top plate member 62 are made of, for example, a high heat-conductive member.

The first top plate member 61 and the second top plate member 62 may be made of other materials. The first top plate member 61 and the second top plate member 62 may be made of the same material or may be made of different materials. Although the first top plate member 61 and the second top plate member 62 adjacent to each other are adhered to each other by the adhesive layer 70, the adhesive layer 70 may not be provided and may not be adhered.

A superconducting coil device of the third modified example has the same effect as the superconducting coil device of the second modified example. Furthermore, the superconducting coil device of the third modified example includes the top plate 60 disposed further above the superconducting wire wound part 10 provided on the upper surface side of the separator 30 and further below the superconducting wire wound part 10 provided on the lower surface side of the separator 30. Since the top plate 60 has high heat conductivity, the cooling performance can be improved. Furthermore, it is possible to increase the strength of the superconducting coil device and protect the superconducting wire wound part 10 by providing the top plate 60.

In addition, the top plate 60 is divided into a plurality of pieces when viewed in the stacking direction, and non-conductive members are interposed. Therefore, it is possible to curb generation of eddy current around the top plate 60 and to curb heat generation due to generation of the eddy current. Even if the top plate 60 is not divided into a plurality of pieces, a slit may be formed in a plate material having conductivity such as a copper plate to cut an eddy current loop circuit, for example. By cutting the eddy current loop circuit, it is possible to cub generation of eddy current and to curb heat generation due to generation of the eddy current.

Fourth Modified Example

Figure 9:
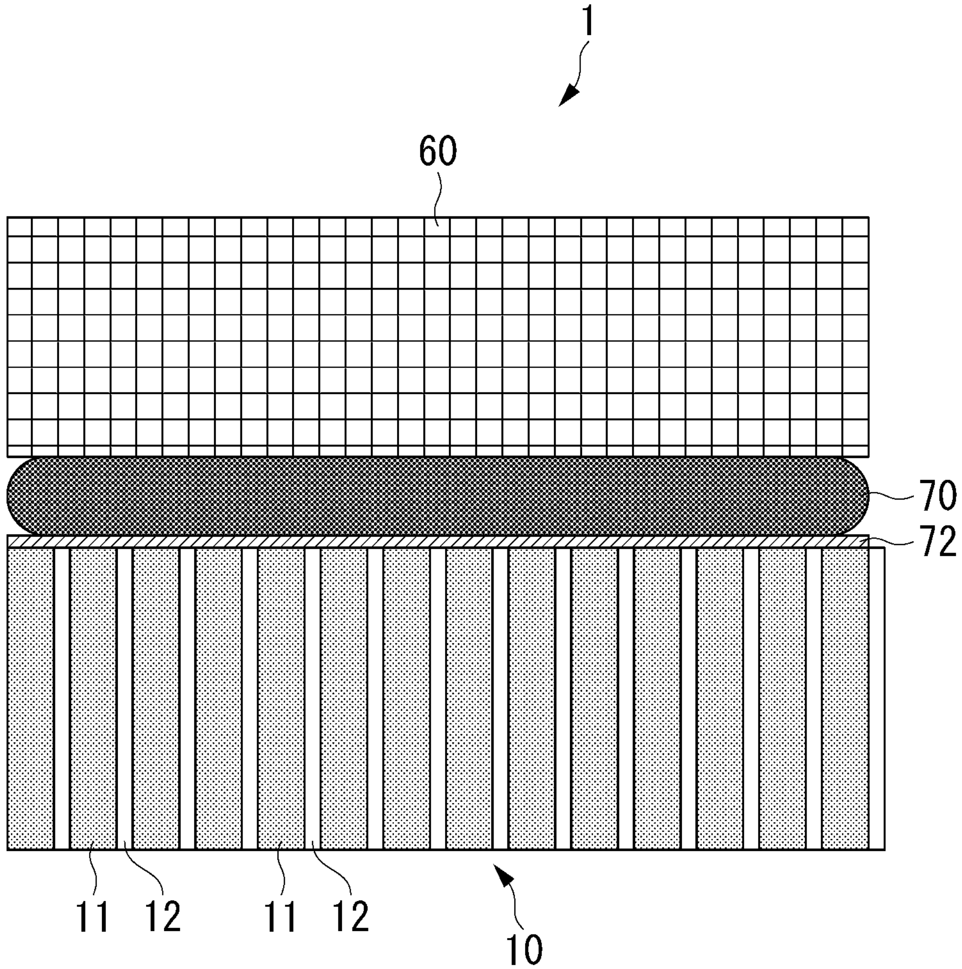
FIG. 9 is an enlarged view of a partial cross section of a pancake coil 1 of a fourth modified example.

Next, a fourth modified example will be described. FIG. 9 is an enlarged view of a partial cross section of a pancake coil 1 of the fourth modified example. The partial cross section in FIG. 9 is a cross section corresponding to line a-a' in FIG. 1. The enlarged portion is the boundary portion between the superconducting wire wound part 10 and the top plate 60. The pancake coil 1 of the fourth modified example is mainly different from the pancake coil 1 of the third modified example in that a resin contact prevention tape 72 is interposed between the superconducting wire wound part 10 and the adhesive layer 70.

The resin contact prevention tape 72 includes a material that prevents permeation of the resin used for the adhesive layer 70. The resin contact prevention tape 72 includes, for example, a polyimide tape, an aramid paper tape, and Japanese paper tape (masking tape). The resin contact prevention tape 72 is interposed over the entire area between the superconducting wire wound part 10 and the adhesive layer 70.

A superconducting coil device of the fourth modified example has the same effect as the superconducting coil device of the third modified example. If the resin permeates into the superconducting wire wound part 10, the resin may cause separation between the high-temperature superconducting wire 11 and the polyimide tape 12 in the superconducting wire wound part 10. When the high-temperature superconducting wire 11 and the polyimide tape 12 are separated from each other, the interlayer separation occurs in the high-temperature superconducting wire 11 at the same time, and thus the characteristics of the high-temperature superconducting wire 11 may deteriorate. In this regard, in the superconducting coil device of the fourth modified example, the resin contact prevention tape 72 is interposed between the superconducting wire wound part 10 and the adhesive layer 70. Therefore, it is possible to prevent the resin in the adhesive layer 70 from permeating into the superconducting wire wound part 10, thereby curbing deterioration of the characteristics of the high-temperature superconducting wire 11 in the superconducting wire wound part 10.

Fifth Modified Example

Figure 10:
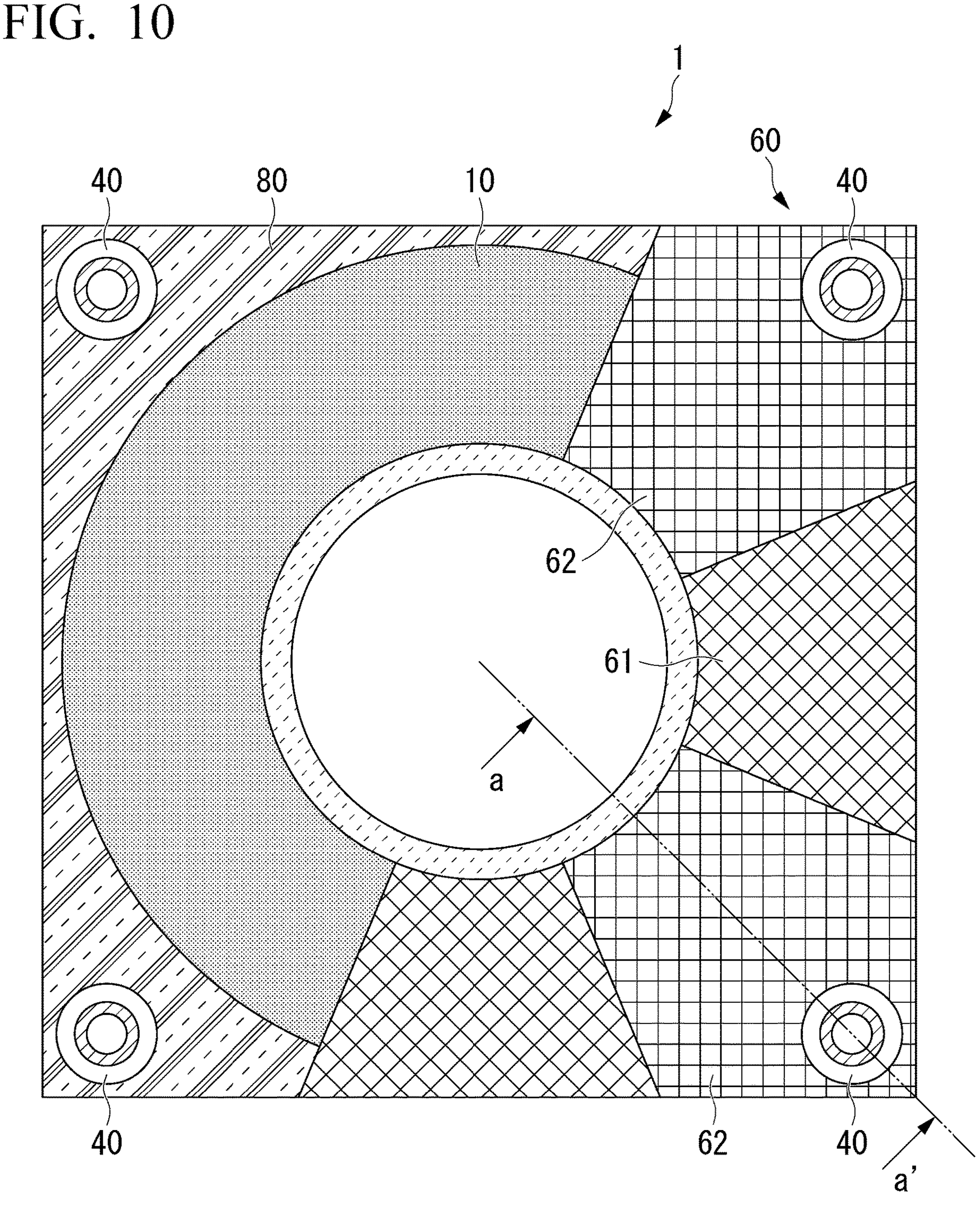
FIG. 10 is a diagram of a pancake coil 1 of a fifth modified example viewed in a stacking direction.
Figure 11:
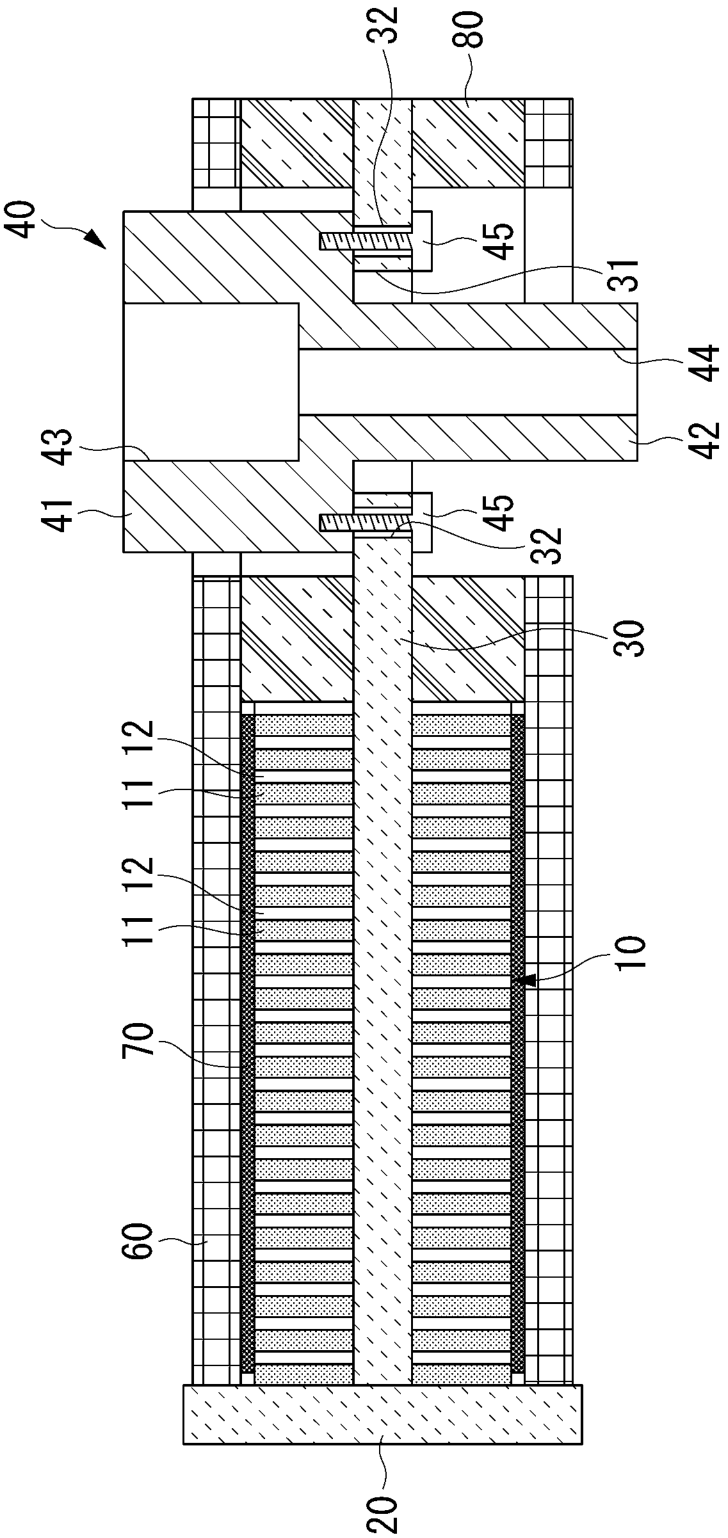
FIG. 11 is a cross-sectional view taken along line a-a' in FIG. 10.

Next, a fifth modified example will be described. FIG. 10 is a diagram of a pancake coil 1 of the fifth modified example viewed in the stacking direction. FIG. 11 is a cross-sectional view taken along line a-a' in FIG. 10. A superconducting coil device of the fifth modified example is mainly different from that of the fourth modified example in that an outer frame 80 is provided.

In the pancake coil 1 of the superconducting coil device in the fifth modified example, the outer frame 80 is provided outside the superconducting wire wound part 10. The outer frame 80 is made of GFRP, for example. A hole 81 is formed in the outer frame 80, and the spigot joint part 40 and the like are inserted into the hole 81.

The superconducting coil device of the fifth modified example has the same effect as the superconducting coil device of the fourth modified example. The superconducting coil device of the fifth modified example includes the outer frame 80. Therefore, it is possible to increase the strength of the pancake coil 1 and curb expansion of the superconducting wire wound part 10.

Sixth Modified Example

Figure 12:
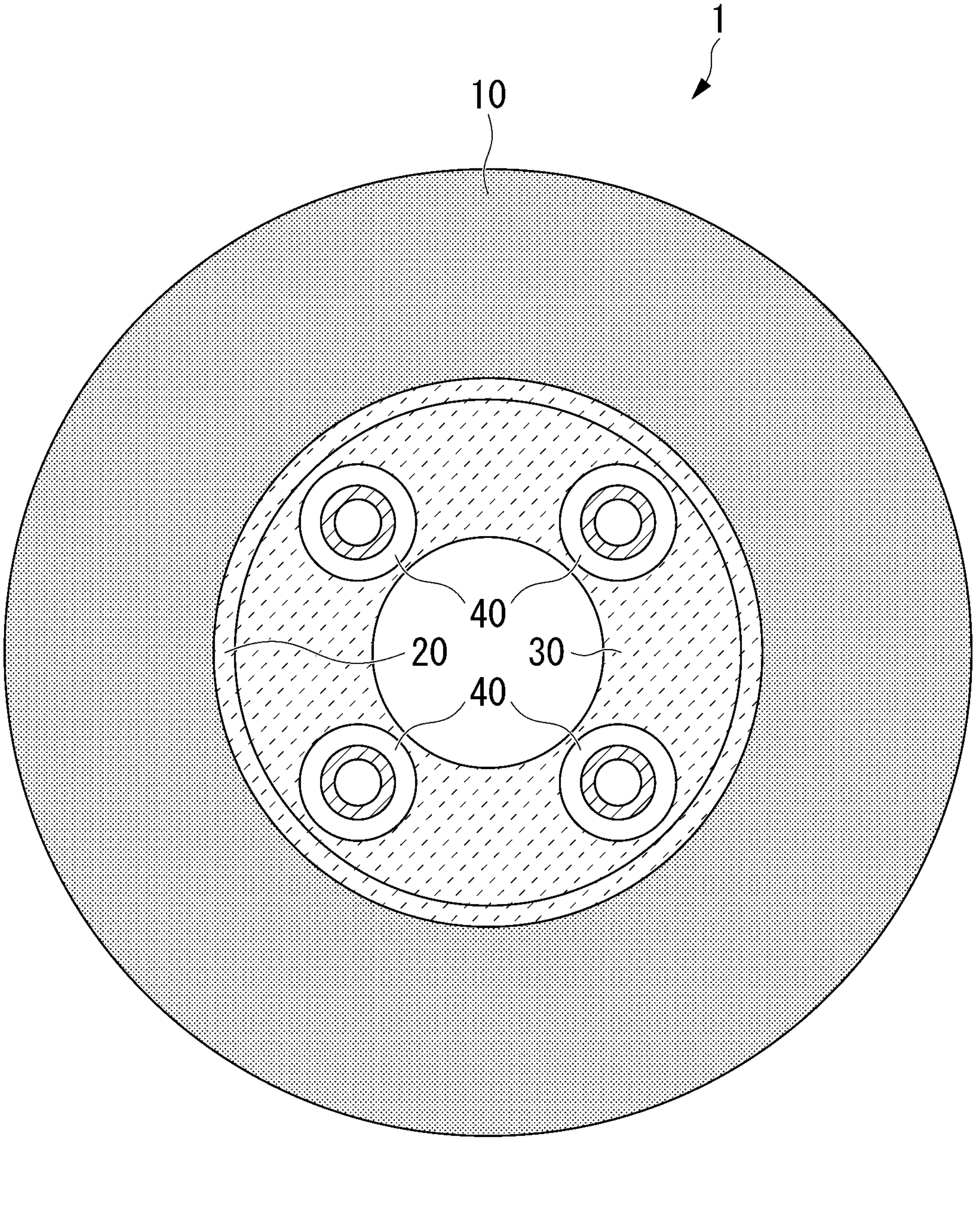
FIG. 12 is a diagram of a pancake coil 1 of a sixth modified example viewed in a stacking direction.

Next, a sixth modified example will be described. FIG. 12 is a diagram of a pancake coil 1 of the sixth modified example viewed in the stacking direction. A superconducting coil device of the sixth modified example is mainly different from the superconducting coil of the embodiment in that a position adjustment part including the fastening holes 31 and the spigot joint part 40 is provided inside the inner frame 20. Moreover, the separator 30 is provided to protrude to the inside of the inner frame 20. Although the outer shape of the separator 30 is omitted in FIG. 12, the outer shape of the separator 30 is the same as that of the embodiment.

In the superconducting coil device of the sixth modified example, the position adjustment part including the fastening hole 31 and the spigot joint part 40 is provided in the portion of the separator 30 that protrudes to the inside of the inner frame 20. The shape of the superconducting wire wound part 10 in the pancake coil 1 changes depending on a required performance and the like, and for example, the superconducting wire wound part 10 may have a large diameter. In such a case, by providing the position adjustment part inside the inner frame 20, the usable area of the separator 30 can be effectively utilized.

Although the position adjustment part is provided outside the pancake coil 1 in the embodiment and it is provided inside the pancake coil 1 (inner frame 20) in the sixth modified example, the position adjustment part may be provided both outside and inside the pancake coil 1. For example, in a case in which a superconducting coil device is provided by stacking a plurality of pancake coils 1 having different diameters, the position adjustment part may be provided outside the superconducting wire wound part 10 for a small-diameter pancake coil portion, and the position adjustment part may be provided inside the superconducting wire wound part 10 for a large-diameter pancake coil portion.

Seventh Modified Example

Figure 13:
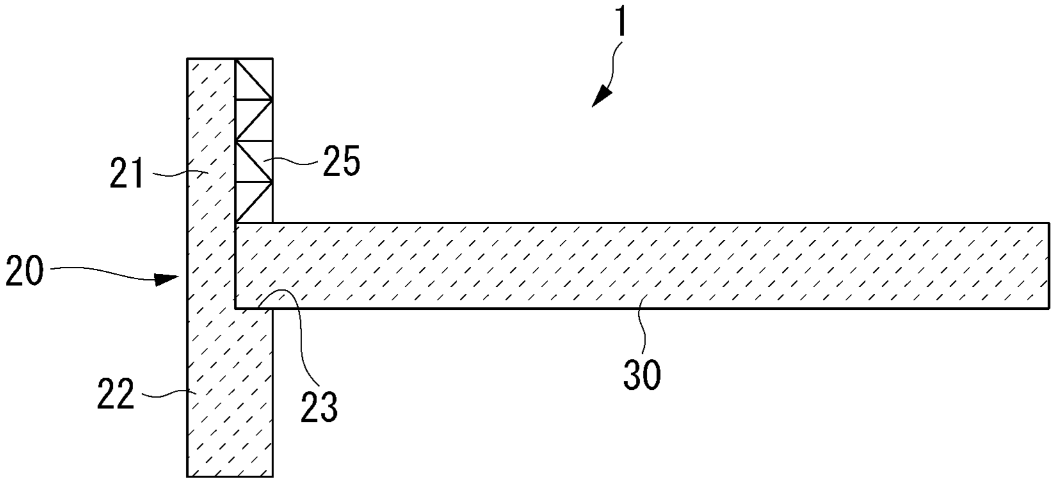
FIG. 13 is a partial cross-sectional view of an inner frame 20 and a separator 30 in a pancake coil 1 of a seventh modified example.

Next, a seventh modified example will be described. FIG. 13 is a partial cross-sectional view of the inner frame 20 and the separator 30 in a pancake coil 1 of the seventh modified example. The partial cross section in FIG. 13 is a cross section corresponding to line a-a' in FIG. 1. A superconducting coil device of the seventh modified example is mainly different from the superconducting coil device of the embodiment in that the inner frame 20 has a step portion compared to the first modified example.

In the seventh modified example, the inner frame 20 includes an upper step portion 21 with a small outer diameter and a lower step portion 22 with a large outer diameter. A step portion 23 is formed between the upper step portion 21 and the lower step portion 22. An end of the separator 30 is positioned in contact with the outer surface of the upper step portion 21 and the upper surface of the step portion 23.

An outer diameter adjustment tape 25 is wound around the upper step portion 21 above the separator 30. The outer diameter adjustment tape 25 is made of, for example, an insulating material or a conductive material. GFRP is exemplified as an insulating material. A superconducting wire is exemplified as a conductive material. By winding the outer diameter adjustment tape 25 around the upper step portion 21, the outer shape of the upper step portion 21 including the outer diameter adjustment tape 25 and the outer shape of the lower step portion 22 are adjusted to be the same.

The superconducting coil device of the seventh modified example has the same effect as the superconducting coil device of the first modified example. Further, in the superconducting coil device of the seventh modified example, the step portion 23 is formed in the inner frame 20. Since the separator 30 can be aligned by bringing the end surface of the separator 30 into contact with the step portion 23, alignment of the separator 30 can be easily performed.

In addition, the formation of the step portion 23 in the inner frame 20 changes the outer diameters of the upper step portion 21 and the lower step portion 22. Therefore, when trying to provide the superconducting wire wound part 10 on both the upper surface side and the lower surface side of the separator 30 as a double pancake coil, there is a concern that the inner diameters of both may change. In this respect, the outer diameter adjustment tape 25 is wound around the upper step portion 21 above the separator 30. Therefore, the inner diameters of the superconducting wire wound parts 10 provided on the upper surface side and the lower surface side of the separator 30 can be easily made uniform.

According to at least one embodiment described above, a superconducting coil device includes stacked pancake coils, each of the stacked pancake coils includes an inner frame, a separator disposed outside the inner frame, and a superconducting wire wound part formed on the separator, and a position adjustment part that adjusts relative positions of the stacked plurality of pancake coils is provided, thereby, uniform magnetic fields can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A superconducting coil device comprising stacked pancake coils, each of the stacked pancake coils comprising an inner frame, a separator disposed outside the inner frame, and a superconducting wire wound part formed on the separator, wherein the superconducting coil device further comprises a position adjustment part configured to adjust relative positions of the stacked pancake coils, each of the stacked pancake coils further comprises:

an insertion portion to be inserted into a fastening hole formed in the separator; and a spigot joint part to be fastened to the fastening hole, the position adjustment part comprises the insertion portion and the fastening hole, and an inner diameter of the fastening hole is greater than an outer diameter of the insertion portion.

2. The superconducting coil device according to claim 1, wherein a difference in length between the fastening hole and the insertion portion is greater than a difference between the center of a magnetic field corresponding to the shape of the superconducting wire wound part and the center of the inner frame.

3. The superconducting coil device according to claim 1, wherein the pancake coils include at least one of a single pancake coil in which the superconducting wire wound part is formed on one side of the separator, or a double pancake coil in which the superconducting wire wound part is formed on both sides of the separator.

4. The superconducting coil device according to claim 1, wherein a through-hole is formed in the spigot joint part, and the stacked pancake coils are fastened using a fastening bolt penetrating the through-hole.

5. The superconducting coil device according to claim 1, wherein the spigot joint part comprises a head portion integrated with the insertion portion, and the spigot joint part is fixed to the separator by screwing the head portion to the separator.

6. The superconducting coil device according to claim 1, wherein the spigot joint part comprises a head portion integrated with the insertion portion, and the spigot joint part is fixed to the separator by adhering the head portion to the separator.

7. The superconducting coil device according to claim 1, wherein a top plate is adhered through an adhesive layer to a surface of the superconducting wire wound part opposite to a side on which the separator is disposed.

8. The superconducting coil device according to claim 7, wherein the top plate is divided into a plurality of pieces when viewed in a stacking direction of the stacked pancake coils.

9. The superconducting coil device according to claim 7, wherein a resin contact prevention tape is interposed between the adhesive layer and the superconducting wire wound part.

10. The superconducting coil device according to claim 1, wherein each of the stacked pancake coils comprises an outer frame provided outside the superconducting wire wound part.

11. The superconducting coil device according to claim 1, wherein the fastening hole is formed outside or inside a position of the separator where the superconducting wire wound part is formed.

12. The superconducting coil device according to claim 1, wherein the separator contains a conductive material.

13. The superconducting coil device according to claim 1, wherein a step is formed on the outer surface of the inner frame, and the separator is positioned by an end of the separator coming into contact with a small-diameter step in the inner frame.

14. The superconducting coil device according to claim 13, wherein an outer diameter adjustment tape containing an insulating material or a conductive material is wound around the small-diameter step in the inner frame.

* * * * *